United States Patent [19]

Dietle et al.

[11] Patent Number: 5,230,520
[45] Date of Patent: Jul. 27, 1993

[54] HYDRODYNAMICALLY LUBRICATED ROTARY SHAFT SEAL HAVING TWIST RESISTANT GEOMETRY

[75] Inventors: Lannie Dietle; Jeffrey D. Gobeli, both of Houston, Tex.

[73] Assignee: Kalsi Engineering, Inc., Sugar Land, Tex.

[21] Appl. No.: 851,532

[22] Filed: Mar. 13, 1992

[51] Int. Cl.⁵ .............................................. F16J 15/16
[52] U.S. Cl. .................................. 277/134; 277/165; 277/177; 277/211
[58] Field of Search .................. 277/177, 134, 207 R, 277/211, 165, 152, 67

[56] References Cited

U.S. PATENT DOCUMENTS

| | | | |
|---|---|---|---|
| 3,970,321 | 7/1976 | Dechavanne | 277/165 X |
| 3,980,309 | 9/1976 | Dechavanne | 277/165 X |
| 4,089,533 | 5/1978 | Knudson | 277/152 |
| 4,371,177 | 2/1983 | Bähr et al. | 277/152 |
| 4,387,902 | 6/1983 | Conover | 277/207 R X |
| 4,593,914 | 6/1986 | Johnson | 277/165 X |
| 4,610,319 | 9/1986 | Kalsi | 384/94 X |
| 5,040,905 | 8/1991 | Boyd | 277/177 X |

FOREIGN PATENT DOCUMENTS

| | | | |
|---|---|---|---|
| 2348739 | 6/1974 | Fed. Rep. of Germany | 277/134 |
| 0826521 | 1/1960 | United Kingdom | 277/177 |

*Primary Examiner*—William A. Cuchlinski, Jr.
*Assistant Examiner*—James K. Folker
*Attorney, Agent, or Firm*—James L. Jackson

[57] ABSTRACT

A hydrodynamically lubricated squeeze packing type rotary shaft with a cross-sectional geometry suitable for pressurized lubricant retention is provided which, in the preferred embodiment, incorporates a protuberant static sealing interface that, compared to prior art, dramatically improves the exclusionary action of the dynamic sealing interface in low pressure and unpressurized applications by achieving symmetrical deformation of the seal at the static and dynamic sealing interfaces. In abrasive environments, the improved exclusionary action results in a dramatic reduction of seal and shaft wear, compared to prior art, and provides a significant increase in seal life.

The invention also increases seal life by making higher levels of initial compression possible, compared to prior art, without compromising hydrodynamic lubrication; this added compression makes the seal more tolerant of compression set, abrasive wear, mechanical misalignment, dynamic runout, and manufacturing tolerances, and also makes hydrodynamic seals with smaller cross-sections more practical.

In alternate embodiments, the benefits enumerated above are achieved by cooperative configurations of the seal and the gland which achieve symmetrical deformation of the seal at the static and dynamic sealing interfaces. The seal may also be configured such that predetermined radial compression deforms it to a desired operative configuration, even through symmetrical deformation is lacking.

9 Claims, 5 Drawing Sheets

HYDRODYNAMICALLY LUBRICATED ROTARY SHAFT SEAL HAVING TWIST RESISTANT GEOMETRY

FIELD OF THE INVENTION

This invention relates generally to hydrodynamically lubricated rotary shaft seals and more particularly to a hydrodynamically lubricated rotary shaft seal having a protuberant static sealing interface geometry that minimizes the possibility of seal twisting that would otherwise occur as the result of radial compression thereof.

BACKGROUND OF THE INVENTION

The oil field drilling industry has found many uses for the hydrodynamically lubricated, ring shaped squeeze packing type rotary shaft seals embodying the principles set forth in U.S. Pat. No. 4,610,319 and marketed by Kalsi Engineering, Inc. of Sugarland, Tx. under the registered trademark, Kalsi Seals ®. Hydrodynamically lubricated seals are used to provide lubricant retention and contaminant exclusion in harsh abrasive environments, such as the downhole oil field drilling environment, and have been successfully used in both low and high lubricant pressure installations. Present commercial oil field related applications include rotary cone rock bits, mud motors, high speed coring swivels, and rotating drilling heads. All references herein to hydrodynamically lubricated seals or hydrodynamic seals are directed to seals embodying the principles of the above identified U.S. Patent.

Figure 12:
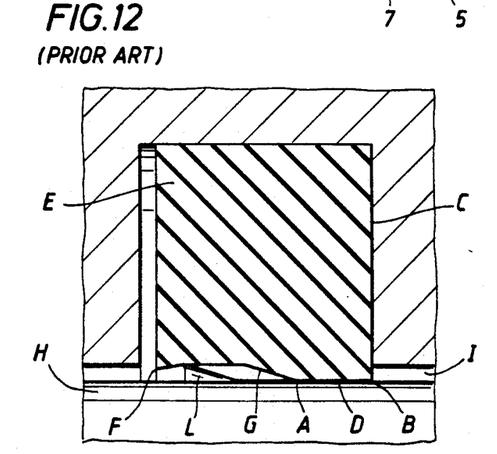
FIGS. 12 and 12A are fragmentary sectional views of a general purpose hydrodynamic seal representing the prior art and shown in FIG. 12 to be located in radially compressed condition within a sealing gland and establishing hydrodynamic sealing engagement with a rotary shaft; the seal being shown in the uncompressed condition thereof in FIG. 12A.
Figure 13:
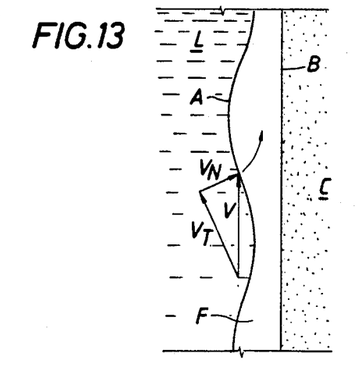
FIG. 13 is a planar representation of the configuration of the sealing interface of a hydrodynamic seal which illustrates theoretical development of the hydrodynamic wedging or pumping action thereof.
Figure 14:
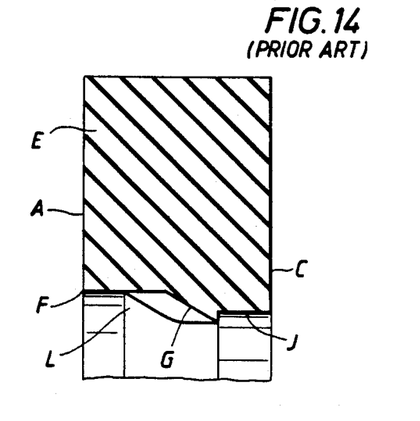
FIG. 14 is a fragmentary sectional view of a general purpose hydrodynamic rotary shaft seal representing the prior art and illustrating a wear pattern caused by ingestion of abrasive material from the contaminant side thereof.

FIGS. 11-18 of this specification represent prior art hydrodynamic seals which are discussed herein to enhance the readers' understanding of the distinction between these prior art seals and the present invention. One of the first commercially implemented oil field related applications for the hydrodynamic rotary shaft seal is a low lubricant pressure application, the rotary cone drilling bit, which is exemplified in FIG. 11. The cross-sectional geometry of the rotary cone hydrodynamic drill bit seal is dictated by the shape, length and relative position of the shaft interface and by the relative position of the seal groove. This results in an dynamic contact geometry that is approximately centered relative to the static geometry of the seal. The drill bit seal defines a static sealing interface 1, an environmental side 2 for contact with the drilling fluid and a lubricant side 3 for contact with the lubricant in the lubricant chamber of the bit. The seal also forms a sharp exclusionary edge 4 and a dynamic sealing interface 5 which are in contact with the cylindrical sealing surface 6 of the shaft and forms a non-circular hydrodynamic edge 7 which is exposed to the lubricant. The laterally offset relationship of the planar surface 2 on the environmental or mud side of the seal and the sharp circular exclusionary edge 4 is dictated by the corner radius of the shaft 8. This feature causes the dynamic sealing interface of the drill bit seal to be substantially centered with respect to the static interface of the seal. Consequently, radial compression of the hydrodynamic rotary cone drill bit seal does not tend to induce twisting of the seal. Development of the cylindrical "footprint" of the dynamic sealing interface of the drill bit seal is shown in FIG. 13.

TESTING OF DRILL BIT SEALS

Exhaustive field tests, which included specimens of hydrodynamic drill bit seals and the conventional oval cross-section non-hydrodynamic bit seal, indicated that the hydrodynamic and exclusionary features of the hydrodynamic seals were effective in reducing wear of the seal and the mating relatively rotating shaft surface. In some cases the inner surfaces of the hydrodynamic seals were virtually without wear after prolonged testing; the molded in surface finish from the mold cavity was still visible. Under the same running conditions, the standard non-hydrodynamic seals, which were used as control specimens, usually exhibited substantial grooving on the inner surface, and also caused grooving of the mating shaft sealing surface. From analysis of the field test data, the bit manufacturer concluded that the "overall life and reliability of the sealed journal bearing rock bit is significantly improved by the use of the hydrodynamically lubricated seal", and put the seal into widespread commercial use in rotary cone drilling bits.

The hydrodynamic drill bit seal geometry described herein has been subjected to extensive large displacement finite element analysis throughout its development in order to control the shape and location of the dynamic sealing interface, the nature of the dynamic interface contact pressure profile, and the fit of the overall cross-section within the gland. Bit seal film thickness and interfacial contact pressure predictions indicate that seal lubrication induced by the "wedging" activity is adequate under typical operating conditions, and also indicate that the interfacial pressure distribution is highly desirable in that it rises sharply in the vicinity of the exclusionary edge.

The shape of the interfacial contact zone of the bit seal was also experimentally measured under the range of conditions of compression and temperature which are encountered in actual service. The results indicate that although the bit seal interfacial contact zone or "footprint", as shown at "F" in FIG. 13, gradually widens as temperature and compression increase, the wave defined by the hydrodynamic edge "A" maintains its height and shape very well, and the sharp exclusion edge "B" of the seal maintains contact with the shaft and does not bulge to any appreciable extent or tend to lift away from the shaft. The footprint width measurements were found to correlate closely with the width predictions of the previously mentioned finite element analysis.

The bit seal finite element analysis demonstrated that the bit seal cross-sectional geometry, as modeled at the mean wave height, is relatively stable in compression, and has no gross overall tendency to tip in one direction or the other. The inherent stability of the design is related to the fact that the inner dynamic sealing geometry is approximately centered in the axial direction relative to the outer, static sealing geometry.

Although the hydrodynamic bit seal is relatively stable in low or no pressure applications, it would not be appropriate for high pressure applications, such as 500-1500 psi mud motor sealed bearing lubricant retention service, because the dynamic sealing geometry is not directly supported by the seal gland wall. In a hypothetical case where a bit seal is subjected to high lubricant pressure, the seal would be driven toward the opposite gland wall. Initial contact with the gland wall would occur at a diameter which is substantially larger than the sealing interface at the shaft. The hydrostatic pressure acting over the unsupported area between the wall contact and the shaft contact would exert a tremendous force on the inner diameter of the seal. As a result, the inner diameter of the seal would undergo extraordinary distortion as the lubricant pressure forced it toward the opposite gland wall. Such gross distortion of the hydrodynamic geometry would prevent hydrodynamic lubrication of the interface, and thereby result in rapid failure of the seal due to wear from direct rubbing contact, melting from frictional heat, and rapid extrusion due to softening of the elastomer.

GENERAL PURPOSE HYDRODYNAMIC SEAL

Figure 12A:
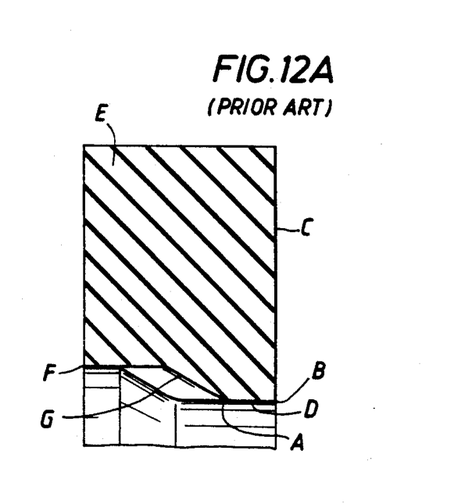

A general purpose hydrodynamic seal has also been developed within the scope of the above identified U.S. Patent. As shown in FIGS. 12 and 12 A, representing the prior art, with FIG. 12 illustrating the compressed condition of the seal within a gland and FIG. 12 A showing the uncompressed condition of the seal. As shown in FIG. 12, a typical general purpose hydrodynamic rotary shaft seal "E" is shown to be installed in a circular housing groove which is sized to hold the resilient, circular sealing element in radial compression against the cylindrical sealing surface of the shaft, thereby initiating a static seal with the housing and a dynamic seal with the rotary shaft in the same manner as any conventional squeeze packing seal, such as an O-ring. When shaft rotation takes place, the hydrodynamic seal remains stationary with respect to the housing, and maintains a static sealing interface with said housing, while the seal-to-shaft interface becomes a dynamic sealing interface.

As illustrated in FIGS. 12 and 12 A, and as illustrated graphically in FIG. 13, the inner peripheral surface "D" of the hydrodynamic seal incorporates a geometry that promotes long seal life by hydrodynamically lubricating the dynamic seal-to-shaft interfacial zone, and by excluding environmental contaminates from the seal to shaft interface. The inner peripheral hydrodynamic seal geometry incorporates a wavy, axially varying edge "A" on the lubricant side of the inner diameter, and a straight or sharp exclusionary edge "B" on the environmental side "C". As relative rotation of the shaft takes place, the wave shape on the lubricant side "L", which has a gradually converging shape "G" in the axial direction, generates a hydrodynamic wedging action (due to the normal component Vn of the rotational velocity V), as shown in FIG. 13, that introduces a lubricant film between the seal "E" and the shaft "H". This lubricant film physically separates the seal and the shaft, and thereby prevents the typical dry rubbing type wear associated with conventional non-hydrodynamic squeeze packing type seals, and thereby prolongs seal and mating shaft surface life and makes higher service pressures practical. The straight, sharp edge "B" on the environmental side "C" at the seal-to-shaft interface is not axially varying, and does not generate a hydrodynamic wedging action, and thereby functions to exclude particulate contaminants from the seal-to-shaft interface. Slight axial shaft motions occur in many types of rotating machinery due to component flexibility and various internal clearances. The sharp corner "B" at the edge of the non-hydrodynamic side of the sealing interface, which is commonly known as the exclusion side or exclusion edge, excludes contaminants by performing a shaft scraping function during such axial shaft motions. Thus, as relative axial movement occurs between the shaft and seal accumulated contaminants, typically abrasive matter, is scraped from the sealing surface of the shaft so that the dynamic sealing interface remains free of contaminants. Additionally, the hydrodynamic wedging action that is induced by interaction of the lubricant and the hydrodynamic edge "A" develops a controlled lubricant pumping action from the lubricant side to the environmental side of the dynamic interface, which results in a minute lubricant leakage rate; this leakage or lubricant film movement tends to flush particulate contaminants out of the seal-to-shaft interface and to the contaminant side of the seal should any contaminant matter enter the dynamic sealing interface past the exclusion edge "B".

The cross-sectional shape of the hydrodynamic rotary shaft seal that is used in drill bits differs significantly from the cross-sectional shape that is offered commercially for other applications. Space is severely limited in a drill bit due to mechanical strength considerations, and the cross-sectional geometry of the hydrodynamic bit seal is dictated by the shape and length of the shaft interface, and by the geometry and relative position of the seal groove. These constraints upon the seal result in a dynamic sealing interface geometry that is approximately centered relative to the static sealing interface geometry. In this respect, the cross-section of the bit seal is substantially different than the cross-section of the standard general purpose Kalsi Seals product line, which, unlike the bit seal, is intended for use in both high and low pressure applications. The general purpose seals have a dynamic sealing interface that is offset relative to the static sealing interface. Unlike the bit seal, which is designed for a specific low pressure application, the general purpose hydrodynamic seal is intended for usage in both high and low pressure service. For this reason, the cross-sectional shape of the general purpose seal is substantially different from that of the bit seal; the sharp exclusion edge is preferably located at the extreme end of the environmental side of the seal. The location of the sharp exclusion edge on the general purpose hydrodynamic seal is dictated by the need for support from the gland wall in high pressure applications. This shape is dictated by the fact that when conditions of high lubricant pressure exist, the exclusion side of the seal is forced against the gland wall by the differential pressure between the lubricant and contaminant, as shown in FIG. 12. If the exclusion edge were not at the extreme end of the environmental side of the seal, then the seal would be subject to gross distortion and the inhibition of hydrodynamic performance, as described previously in the hypothetical case of a bit seal subjected to high pressure.

Since the design of the general purpose hydrodynamic seal is such that the sharp exclusion edge is at the extreme end of the environmental side of the seal, and since the shape of the environmental end of the seal is substantially the same as that of the environmental side gland wall, the general purpose seal is well supported against the lubricant pressure at all locations except the clearance gap "I" which exists between the housing and the shaft. This gap, which is often referred to as the extrusion gap, is kept very small so that the rigidity of the seal material can bridge the gap and resist significant deformation by the resulting hydrostatic pressure.

DESCRIPTION OF THE PROBLEM

Although the general purpose hydrodynamic rotary shaft seal evidenced by FIG. 12 works very well for pressurized lubricant retention in abrasive environments, (as evidenced by its widespread use as a high pressure mud motor seal) it sometimes exhibits premature abrasive wear when it is used in non-pressurized or low pressure lubricant retention service in an abrasive environment.

The most widespread low pressure usage of the general purpose hydrodynamic rotary shaft seal is in oil field drilling mud motor sealed bearing assemblies, which are used for drilling into hard earth and rock formations, and which represent a particularly difficult shaft sealing application.

The low pressure seals on a mud motor must perform under the following combination of hostile conditions:

1. High fluctuating levels of lateral shaft deflection.
2. An elevated temperature environment due to geothermal, bearing, and seal generated heat.
3. A highly abrasive drilling fluid environment.
4. Limited lubricant reservoir volume.
5. Severe radial and axial space constraints.
6. Static shaft to housing misalignment.
7. High levels of vibration.
8. Axial shaft motion due to internal mechanical clearances and component elasticity.
9. Axial seal movement due to pressure balancing considerations.

A good low pressure drilling mud motor seal implementation must have the ability to function under the aforementioned combination of adverse conditions with low leakage and a long dependable service life; the mud motor high pressure seal must also endure 500–1500 psi lubricant pressure in addition to the aforementioned problems.

The mud motor, which is positioned at the bottom end of the drill string, is a positive displacement hydraulic motor that powers the rotation of the drill bit. It is driven by the recirculating drilling fluid, which is also used to flush drilling cuttings out of the well bore.

A complete mud motor consists of three principle sub-assemblies: a hydraulic motor, a universal joint, and a bearing assembly. Circulating drilling fluid drives the rotor of the hydraulic motor. The universal joint transfers the rotary motion from the rotor to the bearing sub-assembly rotary shaft, to which the drill bit is threadedly connected. Weight is transferred from the drill string to the drill bit via the thrust bearings of the bearing sub-assembly.

As the bit rotates, it bears against and fractures the geologic formation by virtue of the weight on the bit, which is concentrated for that purpose by the cutting structure of the bit. The radial bearings of the bearing sub-assembly serve to orient and guide the bit with respect to the drill string.

In steerable systems, a bent housing is used between the motor sub-assembly and the bearing sub-assembly. Directional control is accomplished by turning the drill string momentarily to point the bent housing in the desired direction of travel. Straight ahead drilling is accomplished by continuous rotation of the drill string. Bent housings place additional side loads on the bearing sub-assembly radial bearings during both the straight and the directional drilling modes, and in cooperation with high frequency variations in axial loading, contribute to the high level of fluctuating shaft deflection which is present.

All mud motor sealed bearing assembly housings are filled with bearing lubricant that is retained by means of rotary sealing elements at each end of the bearing housing arrangement. The lubricant is pressure balanced to the drilling fluid pressure; most designs balance the lubricant to the pressure in the drill string bore. The pressure balancing is usually accomplished by means of a pressure balancing piston that has a sliding sealed relationship with the housing and a rotary sealed relationship with the shaft. The rotary seal of the pressure balancing piston is one of two locations where general purpose hydrodynamic seals are routinely employed as low pressure seals in drilling mud motor sealed bearing assemblies.

After the drilling fluid passes through the hollow shaft of the sealed bearing sub-assembly, and then passes through the drill bit jets and enters the annulus of the well, its pressure drops to a level which is approximately 500–1500 psi below the drill string bore pressure. Since the lubricant pressure within the mud motor bearing assembly is balanced to either the drill string pressure or the annulus pressure, one of the rotary seals has to contain a 500–1500 psi pressure drop between the lubricant and the environment. Since the lubricant is usually pressure balanced to the drill string, the high pressure seal is usually toward the lower end of the assembly.

Experience has shown that it is prudent to protect the high pressure seal and the surrounding mechanical structure from the abrasive drilling fluid environment by providing a barrier fluid and a rotary barrier seal. The barrier seal arrangement, which is the second of two locations where general purpose hydrodynamic seals are employed as low pressure seals in drilling mud motor sealed bearing assemblies, provides a clean lubricant environment on both sides of the high pressure seal.

If a barrier seal is not used, the high pressure seal and the surrounding mechanical structure can experience abrasive wear; this wear can degrade the performance of the high pressure seal in a number of ways. The abrasives present in the extrusion gap between the housing and the shaft can cause considerable wear to the shaft and to the mating bore of the housing, resulting in a larger extrusion gap, which lowers the extrusion resistance of the high pressure rotary seal. The abrasive shaft wear is in the form of a localized groove. When relative axial motion occurs between the housing and the shaft as the result of internal assembly clearances and elasticity of the supporting components, the leading edge of the high pressure seal can become damaged from riding over the groove. Certain drilling fluid media can also chemically attack the material of the high pressure seal when a barrier seal is not used.

The barrier seals are typically mounted in a floating pressure balancing piston that has a sliding sealed relationship with the housing bore and a rotary sealed relationship with the shaft. The purpose of the floating piston is to pressure balance the barrier lubricant to the environment; the barrier lubricant is the lubricant trapped between the barrier seal and the high pressure seal.

MUD MOTOR HYDRODYNAMIC SEAL WEAR INVESTIGATION

Studies of the used low pressure hydrodynamic seals from many different mud motor sealed bearing sub-assembly configurations indicate that premature abrasive wear of the low pressure seals often occurs.

In one well documented case, grooving type wear was apparent on the environmental side of inner periphery of the low pressure seals after less than 70 hours of operation, although both seals were still effective. This characteristic of wear is obviously caused by ingestion of abrasive material into the dynamic sealing interface, i.e., by abrasive particulate that entered the dynamic sealing interface past the exclusion edge of the seal. In another case, a low pressure seal was abrasively worn but still effective after over 200 hours in mud motor barrier seal service. As good as that performance seems, many other low pressure seals from mud motors have been noted that are worn completely smooth on the inner periphery, with virtually no signs of the original axially varying shape remaining.

As a result of mounting evidence concerning the premature abrasive wear of general purpose hydrodynamic seals in low pressure service in mud motors, a test was performed to investigate the problem under controlled laboratory conditions. The test involved a general purpose hydrodynamic seal running on a finely ground tungsten carbide surface in the presence of a lubricant at minimal pressure. Prior to rotation, the seal was subject to a momentary lubricant pressure sufficient to orient the seal squarely against the environmental side of the gland. The environmental side of the seal was exposed to abrasive drilling fluid containing sand. During testing the lubricant temperature was maintained within a temperature range expected for mud motor service.

During the testing procedure, the assembly was torn down approximately every 24 hours to look for signs of wear. Prior to re-assembly the seal and shaft were cleaned thoroughly. Once assembled, the seal was once again subject to a momentary lubricant pressure to orient the seal against the environmental side gland wall.

Even though the sealing interface was cleaned every day, and even through the shaft runout was small, the seal began to exhibit an abrasive wear band at about 100 hours of operation. At about 140 hours, the abrasive wear band had noticeably increased in width. At approximately 160 hours, the torque increased dramatically, more than doubling in value. The increase in torque was accompanied by a corresponding reduction in the leak rate. At about 170 hours the torque dropped almost to its initial value, ran at that level for about 24 hours, then began to increase. At about 200 hours the test was terminated due to the high torque levels. At the conclusion of the test, the seal was still effective, but exhibited a wear pattern such as that illustrated in FIG. 14. It should be noted that a circular wear groove "J" had been formed at the dynamic sealing interface on the contaminant side "C" of the seal.

From about 110 hours to the conclusion of the test, a visible wear pattern gradually developed on the shaft at the location of the sealing interface. At about 100 hours the shaft wear pattern was barely visible, and could not be felt. By about 200 hours the shaft wear pattern had a frosted texture which could be readily felt.

It was initially believed that either the frosted texture of the shaft wear pattern or ingested abrasives were responsible for the increased torque. This was disproved when the worn seal, cleaned for the occasion, exhibited high torque while running on a new shaft surface. Likewise, a new seal did not exhibit high torque when run on the shaft wear pattern. It was concluded that the increased torque which occurred at about 150 hours into the test was the result of a partial loss of hydrodynamic lubrication induced by seal wear. This conclusion is supported by the reduction in leak rate which occurred simultaneously with the increased torque.

Even though the seal was effective at the end of the 200 hour test, barrier seals often do not last that long in real applications due to more the rigorous conditions encountered, such as more dynamic runout, and not being disassembled and cleaned every 24 hours.

Besides indicating a serious degradation in hydrodynamic lubrication, and a corresponding increase in the seal wear rate, the sudden increase of torque in the aforementioned test has another serious implication. Many of the low pressure seals in mud motors are mounted in floating pistons. The only piston anti-rotation device present is the friction of the outer, sliding seal at the sealing interface between the piston and the housing. The outer, sliding seal is generally an O-ring or a combination seal such as is manufactured and sold by Parker Seal under the registered trademark PolyPak ®. Sudden increases in torque can cause the piston and the sliding seal to rotate within the housing. Such rotation can be very destructive to the outer seal because it is in dry rubbing contact with the housing bore. This results in severe wear of the outer seal; such wear has been reported by several customers and witnessed by the inventors. A sudden increase in torque can also make the hydrodynamic seal spin within its gland, which results in seal and gland wear due to the dry sliding contact. To prevent such occurrences, many glands are grit blasted to develop enhanced frictional resistance for static retention of the seal.

When a condition of eccentricity exists between the shaft and the seal gland, the radial seal compression decreases over approximately ½ of the seal circumference and increases on the opposite half. In order to insure that a fluid tight seal is maintained under such eccentric conditions, enough preliminary compression must be provided so that a sufficient level of compression is insured in the offset condition. At the same time, the maximum compression experienced in the offset condition should not adversely affect seal performance. For this reason, it is desirable that the seal be able to tolerate a wide range of compression.

FINITE ELEMENT ANALYSIS OF GENERAL PURPOSE HYDRODYNAMIC SEALS

Although finite element analysis was not used in the initial design of the present general purpose hydrodynamic seal, it was used extensively at a later date to investigate an instance observed in the laboratory where a contact pattern on a shaft indicated that a portion of the seal at the extreme lubricant end of the cross-section was some how rubbing against the shaft during rotation. Other examples of the lubricant end of the shaft touching the seal have since been identified on specimens of low pressure seals taken from drilling mud motors used in the field.

Figure 15:
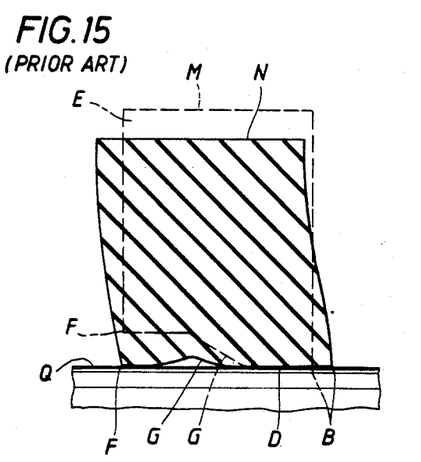
FIGS. 15, 16 and 17 are finite element analysis plots representing prior art general purpose hydrodynamic seals and showing the uncompressed condition thereof by broken line and the radially compressed condition thereof by solid line.

The finite element analysis was performed on a representative general purpose hydrostatic seal, and was used to evaluate the deformed shape of the seal, and the resulting interfacial contact pressure, under a wide variety of temperature, compression, and lubricant pressure conditions. The analysis predicted that the general purpose seal becomes increasingly distorted and twisted under increasing levels of radial compression, and eventually the extreme lubricant edge of the seal touches the shaft. The illustration of FIG. 15, representing the prior art, shows a finite element analysis displacement plot of an unpressurized general purpose seal modeled at midwave height at 11% compression and 180° F. temperature rise. The dashed-line outline at "M" represents the un-deformed shape of the seal. The solid line outline at "N" represents the predicted deformed shape of the seal under radial compression. The displacement plot indicates that, under the conditions modeled, the seal will twist to such an extent that the inner circular corner at the lubricant end of the seal, "F" will touch the shaft surface "Q". Low pressure seal shaft contact patterns indicating such contact have been observed on laboratory test specimens and on used mud motor low pressure seals returned from the field.

Figure 18:
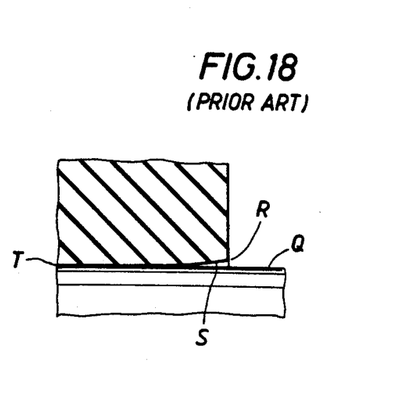
FIG. 18 is an enlarged fragmentary sectional illustration showing lifting of the exclusion edge of the seal from the rotary shaft by tipping or twisting of the seal responsive to radial compression under low differential pressure.

The finite element analysis of the unpressurized seal also indicated another undesirable trend; because of the twisting of the seal within the gland, the sharp extrusion edge "B" of the seal actually lifts off of the shaft, even under relatively low initial compression. This lifting trend worsens as compression increases. The illustration of FIG. 18 shows an enlarged sectional view of the exclusionary edge portion of the previously discussed displacement plot of the unpressurized general purpose seal modeled at mid-wave height at 11% compression and 180° F. temperature rise as had been shown in FIG. 15. FIG. 18 shows the sharp, exclusionary edge of the seal "R" to be lifted away from the rotary shaft countersurface "Q" as a result of compression induced twisting of the seal. In consequence, the seal has a gradually converging shape "S" at the environmental side of the dynamic sealing interface "T". The gently converging shape of the seal is reflected in the interfacial contact pressure profile predicted by the finite element analysis.

Ideally, the contact pressure profile on the environmental side of the dynamic sealing interface should rise abruptly at the sharp edge of the seal, because the sharp edge is intended to provide an exclusionary scraping action. The scraping action is absent when a general purpose hydrodynamic seal is used in an unpressurized application; instead the local seal geometry takes the form of the previously described gradual convergence with the shaft, which is ideal for entrapping abrasives in the event of axial shaft motion. Minute axial shaft motion is present in mud motor sealed bearing assemblies, and other types of equipment, owing to bearing and other mechanical clearances and competent flexibility. As a result of the lifted sharp edge of the seal and the resulting gently converging local seal geometry, the axial motion causes abrasives to be driven into the dynamic sealing interface. This results in abrasive wear of the seal and the shaft.

The degree of seal twisting within the gland is related to the localized height of the hydrodynamic wave. The tipping, and the corresponding lifting of the sharp edge, is greater at the low point of the wave, and less at the high point in the wave. This means that the actual last point of contact on the environmental side of the dynamic sealing interface varies in the axial direction as a function of the hydrodynamic inlet wave height. This phenomenon unfortunately creates a limited hydrodynamic action from the exclusion edge which functions to wedge environmental contaminants into the sealing interface and causes premature wear of the seal even in the absence of axial shaft motion, and thereby limits the operating life of the seal. This conclusion is supported by worn seals from laboratory tests where axial motion was absent.

Figure 16:
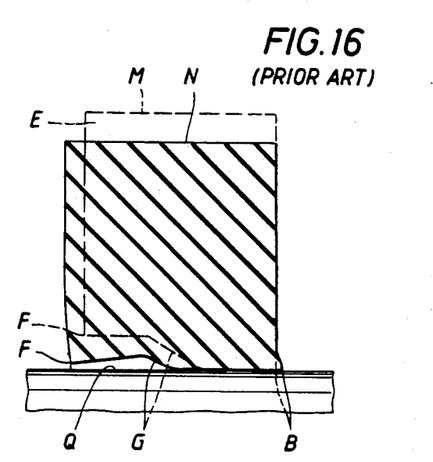

The same 11% compression, 180° F. finite element analysis model as previously discussed was also run with 100 psi differential pressure as evidenced by FIG. 16. This load case predicted that the lubricant side pressure will force the seal to straighten out and bear against the environmental side lubricant wall. This brings the sharp edge into contact with the shaft as intended, resulting in the intended abrupt contact pressure profile at the environmental side of the sealing interface, and the intended exclusionary scraping action. The straightening effect of the lubricant pressure also has the desirable effect of eliminating the shaft contact at the lubricant end of the seal, although the predicted clearance is still small.

Figure 17:
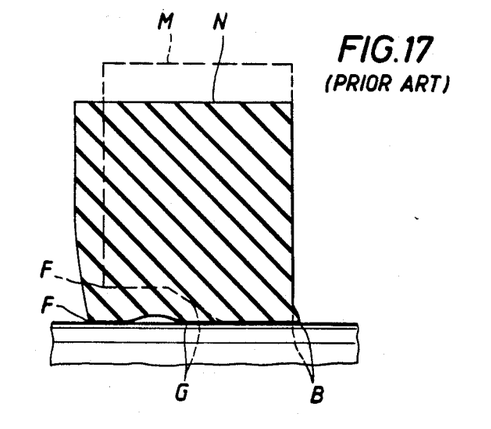

The general purpose seal was also modeled at 15% compression and 180° F. differential temperature as shown by FIG. 17. At this compression level, as shown in full line, virtually the entire inner portion of the seal was flattened out against the shaft; the seal model remained virtually completely flattened against the shaft even when 100 psi differential pressure was applied to the lubricant side. Such extreme distortion of the hydrodynamic geometry would severely inhibit or entirely eliminate the intended hydrodynamic pumping action of the seal because the hydrodynamic edge "G" is virtually isolated from the lubricant by the contact of circular edge "F" with the shaft.

From the finite element analysis results, it was concluded the initial compression of the general purpose seal should be limited to below 9% in the absence of pressure, although up to 12% compression could be used if 100 psi or more lubricant pressure is present. Based on the finite element analysis results, Kalsi Engineering, Inc. began recommending a nominal initial compression of 7½%. Clearly, it would be desirable to have a seal that could tolerate higher levels of compression, because such a seal would be more tolerable of misalignment, runout, tolerances, compression set, and wear.

As a general rule, smaller cross-section seals must necessarily be subject to higher initial compression than larger ones because any given degree of misalignment, dynamic runout, tolerances, wear, etc. corresponds to a higher percentage of the smaller seals cross-sectional size. The compression limitations of the present seal design impose corresponding limits on the minimum effective seal cross-sectional size that is practical to manufacture.

In summary of the finite element analysis predictions, the twisting action of unpressurized seals, which develops as the seal is subjected to radial compression, defeats the intended scraping action of the exclusionary sharp edge and introduces an undesirable hydrodynamic action at the seal-to-shaft interface on the contaminant side of the seal which tends to pump abrasives into the sealing interface. The resulting abrasive wear of the seal because of the presence of the abrasives and because of the minimized lubricant flushing activity that otherwise occurs, limits the operating life of the seal.

The exclusion edge lifting trend is not present in pressurized applications because the lubricant pressure forces the seal against the opposite gland wall, which re-orients the seal and forces the exclusion edge against the shaft. Even though the pressurized seal is immune to the twisting action present in unpressurized seals, both are subject to extreme distortion al higher levels of compression, and accompanying inhibition of the hydrodynamic action. Higher levels of compression than are currently achievable would be desirable.

Field tests of conventional hydrodynamic seal implementation operating under low fluid pressure conditions and high mechanical compression confirm excessive abrasive wear after a relatively short running time: consequently, it is believed that such seals are distorted and twisted under mechanical compression to the extent that the sharp exclusion edge of the seal becomes lifted from the sealing surface of the shaft as shown in FIG. 18, thereby permitting abrasives to be ingested underneath the uplifted sharp edge.

The ultimate life of presently available hydrodynamic shaft seals is also limited by elastomer compression set (permanent deformation) in high temperature installations. It has been observed that most of the compression set usually occurs at the projecting dynamic sealing lip at the inner periphery of the seal, rather than across the main rectangular body of the seal. The reason for this phenomenon is two-fold. First, the lip is right at the source of self generated heat; i.e. the shearing of the lubricant in the sealing interface. Second, since the lip is much smaller than the main body of the seal, it compresses to a higher percentage than the main body due to the disparity in stiffness. The compression set resistance of the seal would be improved if the compression were more evenly distributed across the body of the seal, rather than concentrated in the projecting lip.

SUMMARY OF THE INVENTION

The invention is a hydrodynamic squeeze packing type rotary shaft seal which overcomes the problems previously enumerated regarding a general purpose hydrodynamic rotary shaft seal of the type which is intended to be suitable for both pressurized and unpressurized lubricant service in harsh abrasive environments. The hydrodynamic rotary shaft seal of this invention is provided with an axially varying shape on the lubricant side of the dynamic sealing interface for the purpose of hydrodynamic lubrication of the dynamic sealing interface and has a straight, sharp cornered, non-axially varying exclusionary shape on the environmental side of the dynamic sealing interface for the purpose excluding contaminants. More specifically, the hydrodynamic seal of this invention relates to the commercially available type of hydrodynamic rotary shaft seal which is manufactured and sold by Kalsi Engineering, Inc. of Sugarland, Tx. under U.S. Pat. No. 4,610,319. This hydrodynamic seal has its exclusionary edge positioned at one extreme end of the cross-sectional geometry for the purpose of receiving mechanical support against lubricant pressure acting across the hydrostatic area of the seal with a view towards establishing a cross-sectional geometry that is compatible with high pressure lubricant retention rotary sealing applications.

The present invention dramatically improves the already exceptional performance of the aforementioned general purpose hydrodynamic rotary shaft seals, particularly when the seals are used in non-pressurized or low pressure lubricant retention applications. The improvement is accomplished by eliminating the currently experienced lifting tendency of the exclusionary lip. The improved performance of the exclusionary feature results in a substantially increased sealing life when the seal is used in abrasive environments. The improvement in exclusionary performance also makes the seal less susceptible to violent torque fluctuations which tend to induce spinning of the seal within the gland; when the seal is mounted in a floating piston arrangement, the improved seal is less likely to cause the piston to spin in its bore.

The invention also increases the life of the seals by making higher levels of initial compression possible without compromising the hydrodynamic lubrication feature of the seal; this added compression makes the seal significantly more tolerant of compression set, abrasive wear, mechanical misalignment, dynamic runout and manufacturing tolerances.

The invention also reduces the interfacial contact pressure in the vicinity of the hydrodynamic lubrication inlet geometry, which makes hydrodynamic lubrication more complete and effective at slower speeds.

The invention also provides modest additional improvements in the compression set resistance of the seal by redistributing compression over a larger portion of the seal.

The invention accomplishes all of the aforementioned benefits by implementing a simple and compact protuberant sealing geometry at the non-dynamic sealing interface which provides a reaction to the compressive loads without causing a corresponding twisting of the seal cross-section. The resulting improved seal can be made from existing molds with only minor tooling modifications. The improved seal requires less raw material per part to produce, and fits into the same gland as the existing general purpose hydrodynamic seal and therefore does not require any modification to existing equipment during retrofit.

The invention is a hydrodynamic rotary shaft seal having a protuberant static sealing interface geometry and adjacent seal cross-sectional geometry which substantially duplicates and mirror images a portion of the projecting dynamic sealing interface geometry. With such an arrangement, the overall cross-sectional shape of the hydrodynamic seal approaches a condition of bilateral symmetry which has considerably less tendency to twist during compression because the cross-sectional distortion caused by the compression at the static sealing interface is approximately the same as the distortion caused by the compression at the dynamic sealing interface. This symmetrical seal configuration has no tendency to cause twisting of the seal in the gland when the seal is subjected to radial compression.

A standard general purpose hydrodynamic rotary shaft seal, and also a hydrodynamic rotary shaft seal incorporating the protuberant static sealing interface geometry of the present invention, were tested in the laboratory in a 15 psi lubricant retention service in an abrasive drilling mud environment. The seals were tested on separate portions of the same shaft surface, with the same runout, the same gland, and the same conditions of temperature and speed. The test of the standard general purpose seal has been described in detail in the "Description of the Problem" portion of this disclosure. Briefly summarized, the general purpose seal was torn down for inspection approximately every 24 hours, then afterwards cleaned and reassembled. It exhibited abrasive wear in the form of a groove at 110 hours, and a dramatic increase in torque and an accompanying reduction in lubricant leakage rate at about 160 hours. In contrast, the seal which incorporated the protuberant static sealing lip of the present invention was first disassembled at 144 hours, not having the benefit of being interfacially cleaned every day, and still showed absolutely no wear. The test was concluded after 508 hours and the seal and shaft were carefully inspected. Neither the seal nor the shaft exhibited any signs of wear. The torque remained low and steady throughout the test. The test confirmed that the hydrodynamic rotary shaft seal of this invention accomplishes a truly extraordinary increase in performance over the standard general purpose hydrodynamic seal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

DETAILED DESCRIPTION OF PREFERRED EMBODIMENT

Figure 1:
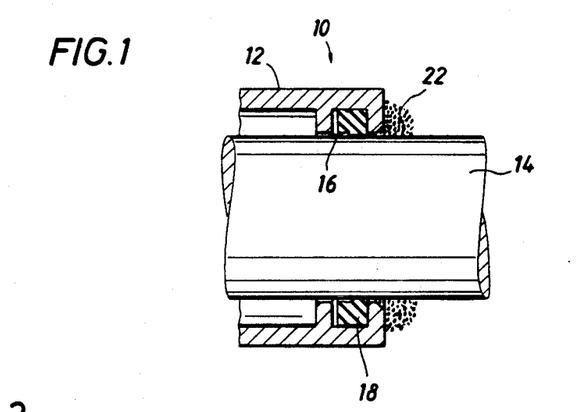
FIG. 1 is a partial cross-sectional illustration of a housing and rotary shaft arrangement incorporating a hydrodynamic rotary shaft seal constructed in accordance with the present invention.
Figures 2, 2A, 3:
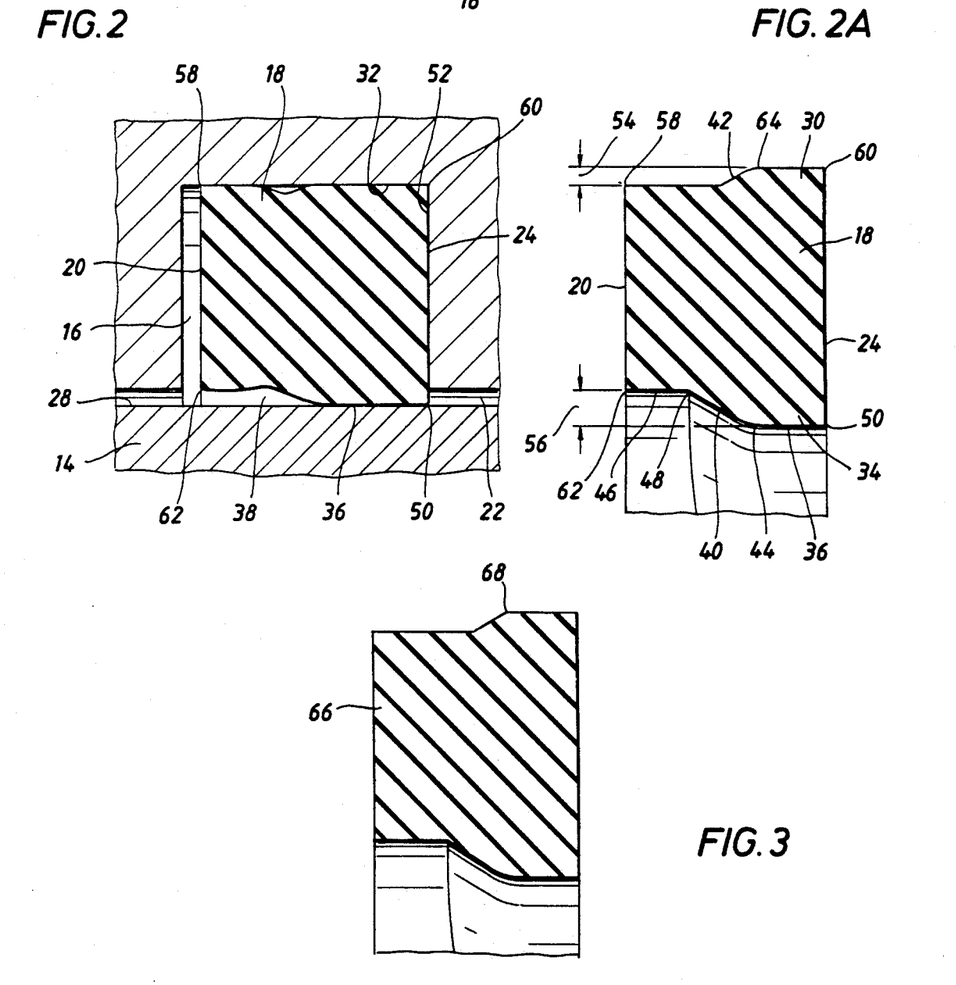
FIGS. 2 and 2A are fragmentary cross-sectional illustrations of a hydrodynamic rotary shaft seal representing the preferred embodiment of the present invention, with FIG. 2 illustrating the compressed condition of the seal within a gland and FIG. 2A showing the uncompressed condition of the seal.
FIG. 3 is cross-sectional illustration of a hydrodynamic rotary shaft seal representing an alternative embodiment of this invention.

Referring now to the drawings and first to FIGS. 1, 2 and 2A, there is shown a cross-sectional view of a hydrodynamic rotary shaft sealing assembly generally at 10 including a housing 12 from which extends a rotary shaft 14. The housing defines an internal seal groove, seat or gland 16 within which is located a hydrodynamic rotary shaft seal 18 which is constructed in accordance with the principles of this invention and which is shown in greater detail in the partial sectional views of FIGS. 2 and 2A. The seal configuration that is illustrated in FIG. 2A represents the radially uncompressed cross-sectional shape of the improved hydrodynamic rotary shaft seal of this invention, while FIG. 2 represents the cross-sectional configuration of the seal when located within its seal groove and radially compressed between the rotary shaft and the radially outer wall of the seal groove. The radial cross-section of FIGS. and 2A is taken at a circumferential location which represents the average interfacial contact width of the dynamic sealing interface, which corresponds to the midpoint in the wave height of the geometry that generates the lubricant wedging action described in U.S. Pat. No. 4,610,319.

From an overall orientation standpoint, the end of the seal which is oriented toward the lubricant is surface 20. This surface may vary from the planar surface represented in FIGS. 2 and 2A without departing form the spirit or scope of the present invention. The end of the seal which is oriented toward the harsh abrasive or contaminant environment 22 is surface 24. This surface may also vary from the planar surface represented in FIGS. 2 and 2A without departing form the spirit or scope of the present invention.

In accordance with the present invention, the circular hydrodynamic sealing element 18 is installed within a circular seat or seal groove 16 and is compressed against a relatively rotating surface 28 of the rotatable shaft 14. When the seal is installed in the circular seal groove or seat, a circular radially protruding static sealing lip or protuberance 30 is compressed against a counter-surface 32. At the inner periphery of the circular sealing element 18 there is provided an inner circumferential protuberance 34 that defines a dynamic sealing surface 36 that is compressed against a relatively rotating counter-surface 28 which is usually, but not always, the circular sealing surface of a rotatable shaft such as that shown at 14. The hydrodynamic sealing element 18 is maintained under sufficient radial compression to ensure maintenance of a liquid tight seal at the static sealing interface between the static sealing lip 30 and the mating counter-surface 32 of the seat, and between the dynamic sealing lip 34 and the relatively rotating counter-surface 28. The hydrodynamic seal is used to separate the lubricant in the lubricant chamber or lubricant side 38 of the seal from the contaminant fluid of the environment 22, and to prevent intermixing of the lubricant and the contaminant matter present within the environment. In the well drilling industry the contaminant fluid is typically drilling fluid called "drilling mud", which contains highly abrasive particulate matter within a liquid vehicle.

The ring shaped hydrodynamic sealing element may be composed of any one of a number of suitable sealing materials including elastomeric or rubber-like sealing material and various polymeric sealing materials.

The inner and outer radial protuberances define tapered surfaces 40 and 42 respectively which face the lubricant side of the seal with surface 40 being of non-circular configuration while surface 42 is of circular configuration. The tapered surface 40 and 42 each define a radius which establishes gradual convergence with the shaft and seat respectively. Tapered surface 40 and the inner cylindrical dynamic sealing surface 36 are merged by a radius 44. Surface 40 intersects a cylindrical surface 46 at a sharp angle of intersection 48. The tapered surface 40 and the radius 44 form an angulated, gradually converging shape on the lubricant side of the dynamic sealing interface which induces hydrodynamic migration of a lubricant film in the dynamic sealing interface as described in U.S. Pat. No. 4,610,319. The geometry of the tapered surface 40 can take any one of many suitable forms that result in a gradually converging shape at the lubricant side of the dynamic sealing lip or protuberance without departing from the spirit and scope of the present invention. The gradually converging shape varies in position about the circumference of the seal in a manner that hydrodynamically wedges a film of lubricant into the dynamic sealing interface as relative rotational movement occurs between the lubricant and the seal.

The circular corner or exclusionary edge shown at 50 represents an abrupt scraping edge geometry of the hydrodynamic seal that does not develop a hydrodynamic action with the environment in response to relative rotary motion and which functions to scrape contaminants from the rotating shaft as relative axial movement occurs between the shaft and seal. The seal thus excludes abrasives present on the contaminant side of the seal from entering the dynamic sealing interface.

The illustration of FIGS. 2 and 2A, and the present invention shown therein, refer specifically to the usual and customary type of general purpose hydrodynamic rotary shaft seal that positions and configures the exclusionary edge 50 and the environmental end 24 of the seal 18 in such a manner that they are largely supported by the gland wall 52 in a manner that resists extrusion of seal material and other related seal damage in those instances when the seal is subjected to the hydrostatic force resulting from the lubricant pressure acting over the area between the static sealing interface and the dynamic sealing interface.

The combination of the abrupt exclusionary corner 50 and the angulated, gradually converging geometry of the tapered surface 40 and radius 44 cooperate to form the protuberant lip 34 which projects radially inwardly from the main body of the seal 18 at the extreme end of the seal which represents the environmental side 24 of the cross-section. The protuberant lip 34, when compressed, establishes the dynamic sealing interface in cooperation with the relatively rotating counter-surface 28 defined by the shaft 14.

The principle geometric feature of the preferred embodiment of the present invention is the protuberant static sealing lip, 30, which projects radially outward from the main body of the seal 18, at the extreme end 24 of the seal which represents the environmental side of the seal cross-section. The protuberant static sealing lip 30, when compressed, establishes a static sealing interface in cooperation with the counter-surface 32 of the circular seat groove.

In the preferred embodiment shown in FIGS. 2 and 2A, the protuberant static sealing lip 30 of the present invention has substantially the same overall cross-sectional configuration as the average cross-sectional configuration of the protuberant dynamic sealing lip 34, with the exception that the overall projection 54 of the static sealing lip 30 is somewhat less than the overall projection 56 of the dynamic sealing lip. (The width of the protuberant static sealing lip 30 could also vary in width to match the varying width of the dynamic lip at any given circumferential location.) Ideally, the projection 54 of the static sealing lip should be equal to or somewhat less than one-half of the nominal radial compression of the seal, and the projection 56 of the dynamic sealing lip should be somewhat greater than one-half of the nominal radial compression of the seal.

Since the projection 54 of the static sealing lip is less than or equal to one-half of the nominal radial compression, as shown in FIG. 2, most or all of the seal surface from circular corners 58 to 60 is brought into direct contact with the mating counter-surface 32 of the seat groove when the seal is compressed. The close proximity and/or contact between the seal and the seat groove in the general vicinity of circular corner 58 provides stability against clockwise twisting of the seal within the gland, with the clockwise direction being visualized with respect to FIG. 2. This seal stabilization feature is especially important in implementations where a hydrostatic and/or mechanical force is applied to the environmental end 24 of the seal, such as during transient pressure fluctuations or when the dynamic sealing interface exclusionary edge 50 is required to actively scrape contaminants off of an axially moving shaft.

Since the projection 56 of the dynamic sealing lip 34 is greater, preferably substantially greater, than one-half of the nominal radial compression of the seal, the seal surface at the radially inner circular corner 62 is not brought into contact with the relatively rotating counter-surface 28, the angulated hydrodynamic inlet geometry from 48 to 44 is not overly flattened against the relatively rotating counter-surface, and the intended hydrodynamic wedging of lubricant into the dynamic sealing interface is unimpeded by any undesirable gross distortion of the hydrodynamic geometry. This general trend means that hydrodynamic seals which implement the protuberant static sealing lip of the present invention can be subjected to higher levels of initial compression, compared to conventional hydrodynamic seal design. The higher compression levels made possible by the present invention make the improved hydrodynamic seals more tolerant of mechanical misalignment, dynamic runout, compression set, wear, and mechanical tolerances, and makes the implementation of seals having smaller cross-sections more practical.

In the preferred embodiment of FIGS. 2 and 2A, the general cross-sectional shape of the protuberant static sealing lip 30 is nearly identical to the average general cross-sectional shape of the protuberant dynamic sealing lip 34; therefore when the seal is compressed, the interfacial contact force profiles and deformation of the two lips are very similar in both magnitude and location, and as a result, there is no gross tendency for the seal to twist severely within the gland to achieve an equilibrium condition.

Since the tendency to twist within the gland has been virtually eliminated by the present invention, any tendency of the sharp edge 50 to lift away from the rotating counter-surface 28 is correspondingly eliminated. This means that the abrupt sharp edge 50 remains compressed firmly against the shaft, and can perform its intended scraping and exclusionary function so that contaminants from the environment do not enter the dynamic sealing interface. The improved exclusionary action means that abrasive invasion of the sealing interface is significantly reduced, and the abrasive wear of the seal and mating rotary counter-surface is correspondingly minimized. The seal life, as proven by testing, is thereby greatly extended, and rotary torques and hydrodynamic leakage rates remain very uniform through-out the effective life of the seal due to the lack of wear. The relative lack of shaft wear means that the shaft does not have to be re-coated and ground as often as is typically the case, which results in a substantial cost savings. Since the seal torque is more stable with the present invention, the incidence of seals spinning within the seat gland due to friction between the seal and shaft are minimized; and as a result, special frictional improvement of the gland, such as the grit blasting that is currently performed, may no longer be necessary.

By largely eliminating the tendency of the seal to twist within the gland, the dynamic interfacial contact pressure in the vicinity of the gradually converging hydrodynamic inlet geometry is reduced, since the seal material at this location is no longer counteracting a gross twisting action of the entire cross-section. The reduction in contact pressure at this critical location will make hydrodynamic lubrication more complete and effective at slower speeds.

By having two radially opposed protuberant lips, one static and one dynamic, the actual compression of the dynamic lip is lowered over that of the dynamic lip in the existing style of general purpose hydrodynamic seal. This will provide an improvement in compression set resistance, because much of the compression set presently occurs in the dynamic lip owing to its proximity to the heat generated at the dynamic sealing interface.

Sealed bearing mud motors are increasingly being used in "hot" holes that sometimes exceed the operating temperature limits of the elastomers commonly used in hydrodynamic seals. The elastomers currently being used for hydrodynamic seals are chosen primarily on the basis of high abrasion resistance and typically have a maximum operating temperature in the range of from 250° F. to 320° F. The hydrodynamic seal of this invention will be able to use elastomers that have higher temperature limits but less abrasion resistance, such as fluoroelastomers, because the twist resistant seal is much better at excluding abrasives from the sealing interface.

This invention has application where rotary shafts are sealed with respect to a housing with either the housing or the shaft being the rotary member. The protuberant lips can be on the inside and outside of the seal cross-sectional shape when the seal is compressed in a radial direction, with the dynamic lip being located on either the inner or the outer periphery. Alternately, The protuberant lips can be on opposite ends of the seal cross-sectional shape when the seal is compressed in an axial direction against relatively rotating, planar counterfaces.

Although the dynamic and static protuberances extend completely to the contaminant end of the seal as shown in the figures, such is not mandatory within the spirit and scope of this invention. It is only necessary that these protuberances be relatively positioned so that radial compression of the seal under low pressure conditions does not induce twisting of the seal within its gland.

DESCRIPTION OF ALTERNATIVE EMBODIMENTS

FIG. 3 illustrates an alternate embodiment of the invention wherein a hydrodynamic seal 66 is shown that is substantially identical to the embodiment shown in FIG. 2A in all respects except that an abrupt circular corner 68 has been substituted for the radiused corner 64 of the seal shown in FIG. 2A. This sharp circular corner will provide an exclusionary function to help prevent lubricant from being pumped into the static sealing interface in instances where the seal is being shuttled back and forth within the seat gland due to fluctuating and/or reversing pressure conditions thereby further reducing any tendency to spin within the gland.

Figure 4:
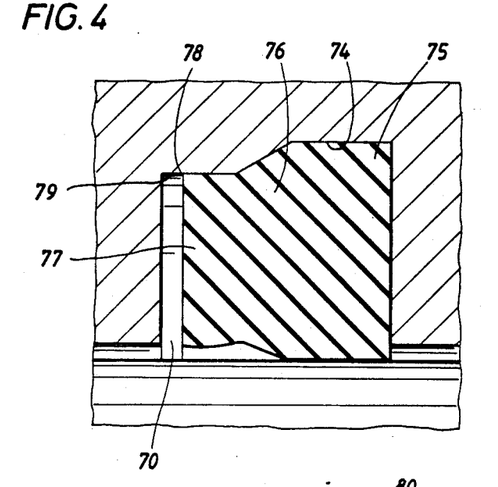
FIGS. 4 and 4A are fragmentary sectional views with FIG. 4 illustrating a housing and rotary shaft arrangement incorporating the hydrodynamic rotary shaft seal of this invention within an internal housing seal groove and FIG. 4A showing the uncompressed configuration of the seal.
Figure 4A:
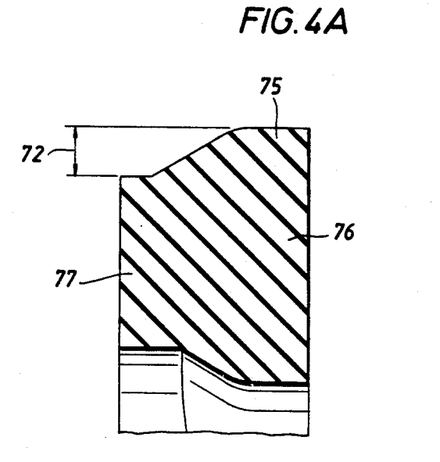

It can be appreciated that a resilient squeeze packing type sealing element is an incomplete sealing device of itself and cannot perform its intended sealing function without the cooperative functions of the gland. The complete hydrodynamic sealing device, therefore, consists of the combination of a gland and the resilient sealing element. FIGS. 4 and 4A respectively illustrate the radially compressed and the uncompressed condition of an alternate embodiment of the invention. As shown in FIG. 4, a sealing gland geometry 70 which, in cooperation with the protuberant static sealing lip 75 of the hydrodynamic sealing element 76, helps to prevent backwards seal installation and shuttling of the seal within the gland. In this arrangement, the radial projection 72 of the static sealing lip is increased substantially over that illustrated in FIGS. 2, 2A and 3, resulting in a projection that is greater than one-half of the initial compression. A corresponding groove 74 is formed in the seat gland to receive the static sealing lip protrusion 75 and compress it radially to a value which is approximately one-half of the total radial compression. When in compression, the tail end 77 of the seal maintains sealing contact with the seat at 78 in a manner that helps to prevent clockwise twisting of the seal due to external loading with the circular corner 78 providing anti-twist reaction with the cylindrical support surface 79. If the seal shown in FIG. 4 is inadvertently installed backwards, if it can be installed at all, it will project out of the gland so far that shaft installation will be extremely difficult or physically impossible, thereby calling attention to the inadvertent backwards installation. Additionally, both the seal static lip geometry and the corresponding gland geometry will give a visual clue as to proper orientation prior to installation. When installed the protuberant static sealing lip 75 is captured by the corresponding geometry 74 formed in the seal groove. The mating geometry of the seal 76 and the seal groove 70 also cause the seal to be restrained against axial shutting movement in response to pressure reversal. Further, this mating seal seal groove geometry also enhances the structural integrity of the seal and thus can permit enhanced radial compression of the seal as compared to other hydrodynamic seals.

Figures 5, 6, 6A:
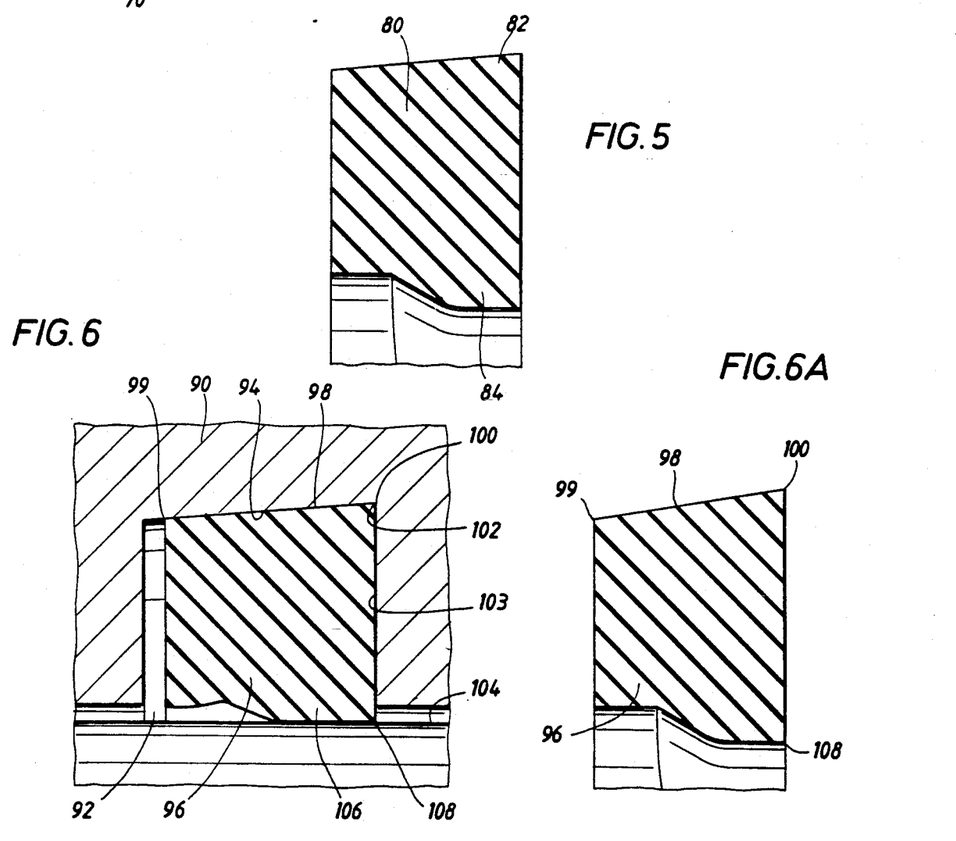
FIG. 5 is a fragmentary sectional view of a hydrodynamic rotary shaft seal representing a further alternative embodiment of this invention.
FIGS. 6 and 6A are fragmentary sectional views with FIG. 6 illustrating a hydrodynamic seal representing an alternative embodiment of this invention being radially compressed within a seal groove having a tapered outer support surface and with FIG. 6A showing the uncompressed configuration of the seal.

Referring now to FIG. 5, there is shown another partial sectional view illustrating the radial cross-sectional configuration of a hydrodynamic sealing element 80 representing another alternative embodiment of this invention. The seal configuration shown in FIG. 5 represents a slight modification of the seal configurations disclosed in FIGS. 2, 2A and 3 wherein the protuberant static sealing lip 82 is in the form of a tapered section of the seal which forms a bevel. While perhaps not as effective as the cross-sections shown in FIGS. 2, 2A and 3 owing to the greater dissimilarity between the geometry of the static lip 82 and the dynamic sealing lip 84, the shape shown in FIG. 5 will still provide the same general benefits as the seal and implementations shown in FIGS. 2, 2A and 3, albeit perhaps to a lesser degree.

Referring now to FIGS. 6-10, controlled radial compression of the hydrodynamic rotary shaft seal may be accomplished by the cooperative relationships of the internal surface configuration of the seal gland together with the external configuration of the hydrodynamic seal. In each of the embodiments set forth in FIGS. 6-10 radial compression of the hydrodynamic sealing element achieves substantially symmetrical deformation thereof at both the static and dynamic sealing interfaces such that radial compression does not induce twisting of the sealing element within the gland.

With reference now to FIGS. 6 and 6A, which respectively illustrate the radially compressed and uncompressed configurations of the seal, the housing 90 is shown to define an internal seal gland 92 having a tapered or frusto-conical radial surface 94. The hydrodynamic sealing element 96 also defines a tapered radially outer surface 98 having a steeper taper as compared with the surface 94. The seal 96 interfits within the seal gland 92 in the uncompressed condition thereof such that a radially outer corner 100 of the seal 96 is intimately engaged with an internal radially outer corner 102 of the seal gland. Thus, when the rotary shaft 104 is inserted through the seal, the seal is deformed both at its hydrodynamic protuberance 106 and at a portion that is radially opposed to the hydrodynamic protuberance such that substantially symmetrical radial compression of the seal takes place. When the seal is compressed in this manner, there is no tendency for it to tip or twist within the gland and thus the exclusionary edge 108 remains in optimum contaminant excluding engagement with the cylindrical surface of the shaft 104. Additionally, when in compression as shown in FIG. 6, the outer circular corner 99 of the seal is disposed in engagement with the support surface 94 of the circular seal groove and thus acquires structural support against compression induced tipping within the seal groove. Because of the taper of surface 94, radial compression of the seal tends to urge the seal toward the internal circular corner 102 of the seal groove thus causing the contaminant side of the seal to seat firmly against the support surface 103.

The cooperative configuration of the seal 96 with the seal gland 92 also insures against backwards installation of the seal within its gland. If installed backwards, with the hydrodynamic surfaces directed toward the contaminant side, the seal will be radially overcompressed to the extent that shaft installation will be difficult or impossible. The hydrodynamic seal of FIGS. 4 and 4A is also difficult or impossible to install backwards for the same reason.

Figure 7:
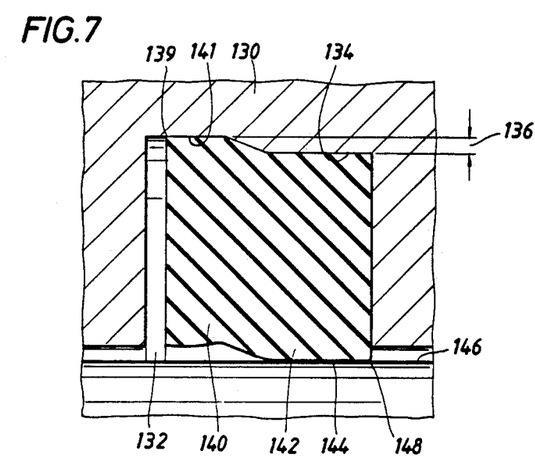
FIGS. 7 and 7A are fragmentary sectional views representing an alternative embodiment of this invention with the seal of FIG. 7 in its compressed condition and with the seal of FIG. 7A being shown uncompressed.
Figure 7A:
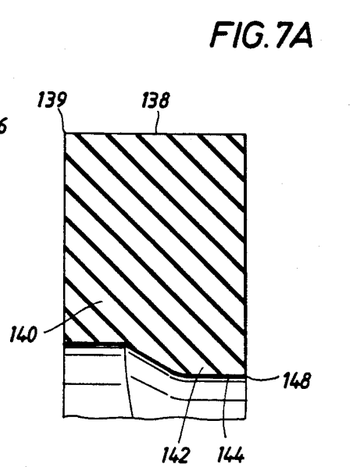

Referring now to FIGS. 7 and 7A, a housing structure 130 is provided with an internal seal gland 132 which defines an internal compression surface 134 providing an internal area of gland relief 136 in relation to the outer surface portion 138 of the hydrodynamic rotary shaft seal 140. To facilitate understanding of the embodiment, the seal 140 is shown in its radially compressed condition in FIG. 7 and in its uncompressed condition in FIG. 7A. The seal configuration of FIG. 7A is that of a general purpose hydrodynamic seal which is deformed to a different configuration, that of FIG. 7A, when subjected to radial compression. The seal compression surface 134 is positioned in radially opposed relation with the hydrodynamic internal protuberance 142 of the seal and is of a width substantially equaling the compressed mean width of the dynamic sealing surface 144 of the hydrodynamic protuberance. Thus, upon radial compression of the seal 140 within the seal gland 132, as the rotary shaft 146 is installed, the radially outer static portion of the seal and the radially inner hydrodynamic protuberance 142 are subjected to substantially symmetrical compression and deformation. This symmetrical radial compression insures that the hydrodynamic sealing element 142 is not subject to tipping or twisting as the result of being radially compressed. The sealing element may thus be subjected to significantly greater radial compression than has been permissible with commercially available hydrodynamic sealing elements. The enhanced compressive capability that is enabled by the combined configurations of the hydrostatic sealing element and the seal gland insures that the exclusionary edge 148 of the sealing element is maintained in efficient particulate excluding engagement with the cylindrical sealing surface of the shaft 146. Further, radial deformation of the seal is such that the radially outer corner 139 of the seal is disposed in contact with the gland support surface 141 to ensure support against tipping of the seal within the gland.

Figure 8:
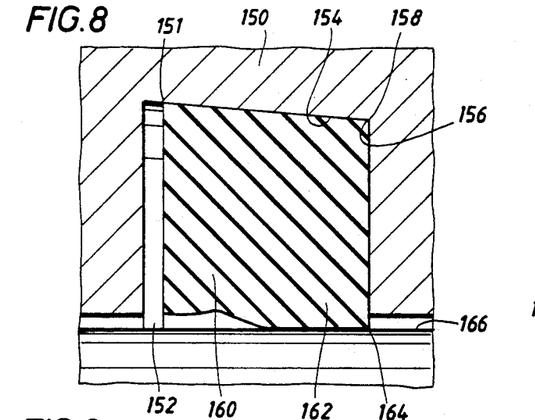
FIGS. 8 and 8A are fragmentary sectional illustrations of another embodiment of the present invention, with FIG. 8 illustrating the compressed condition of the seal and with FIG. 8A showing the seal in its uncompressed state.
Figure 8A:
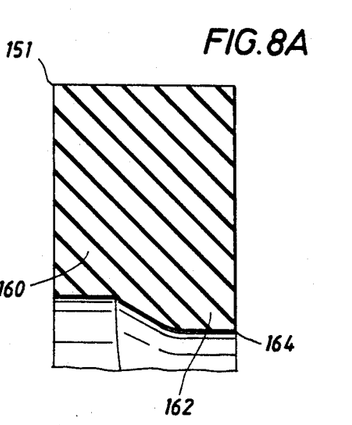

As shown in FIGS. 8 and 8A, a housing structure 150 defines an internal seal gland 152 forming a tapered or frusto-conical gland surface 154 having its smallest diameter 156 corresponding to the outer diameter 158 of the hydrodynamic sealing element 160. As the sealing element is placed under radial compression as shown in FIG. 8 the outer peripheral portion of the sealing element is deformed against the tapered gland surface 154 and the hydrodynamic internal protuberance 162 is also deformed. Since the sealing element is deformed only on its contaminant side to form a static seal with surface 154, the compressive deformation of the sealing element will be substantially symmetrical and the sealing element will not have a gross tendency to tip or twist within the seal gland 152. In absence of twisting, the exclusionary edge 164 will maintain its optimum engagement with the cylindrical outer sealing surface 166 of the rotatable shaft. Additionally the outer corner 151 of the seal will have supported engagement with the support surface 154 as shown in FIG. 8.

Figure 9:
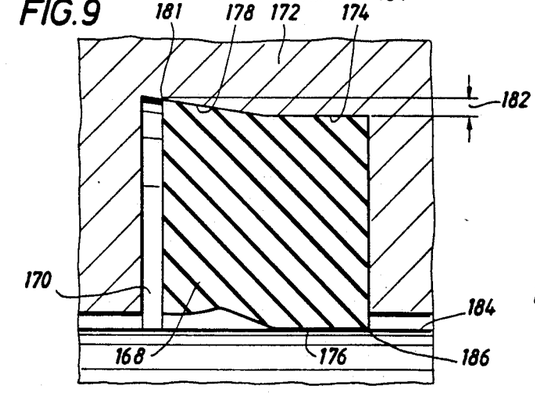
FIGS. 9 and 9A are fragmentary sectional views of a further alternative embodiment of this invention, with FIG. 9 presenting the radially compressed condition of the seal and with FIG. 9A showing the uncompressed configuration of the seal.
Figure 9A:
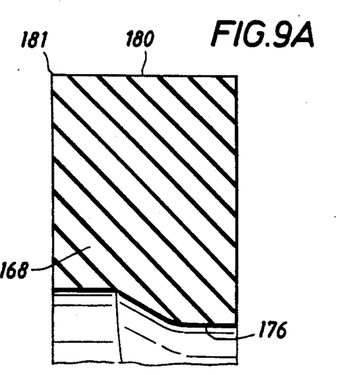

As shown in FIGS. 9 and 9A, a hydrodynamic sealing element 168 of essentially the same structural configuration, a general purpose hydrodynamic rotary shaft seal, such as that shown in FIG. 8 is shown in FIG. 9 to be located in radially compressed condition within an internal seal groove 170 of a housing 172. The housing structure forming the seal groove defines a substantially cylindrical seal compression portion 174 which extends laterally a distance substantially equal to the mean compressed width of the hydrodynamic sealing surface 176. The seal gland includes a tapered internal surface 178 that cooperates with the outer peripheral surface 180 of the sealing element 168 so as to define a circumferential area of relief 182. As the seal 168 is placed under radial compression between the cylindrical sealing surface 184 of the rotatable shaft and the radially opposed compressive surface 174, the seal will be substantially symmetrically deformed and will have no gross tendency to be tipped or twisted within the seal gland 170. The contaminant exclusion edge 186 will remain in scraping engagement with the cylindrical surface of the shaft and will provide effective protection against introduction of contaminants in the dynamic sealing interface. The radially outer corner 181 of the seal will be in supported engagement with the support surface 178, thus supporting the seal against clockwise twisting within the gland.

Figure 10:
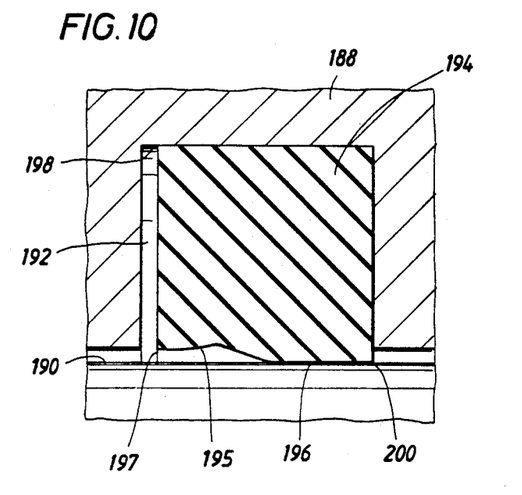
FIGS. 10 and 10A are fragmentary sectional illustrations presenting a further embodiment of this invention, with FIG. 10 showing the radially compressed state of the seal and FIG. 10A illustrating the seal in the uncompressed condition thereof.
Figure 10A:
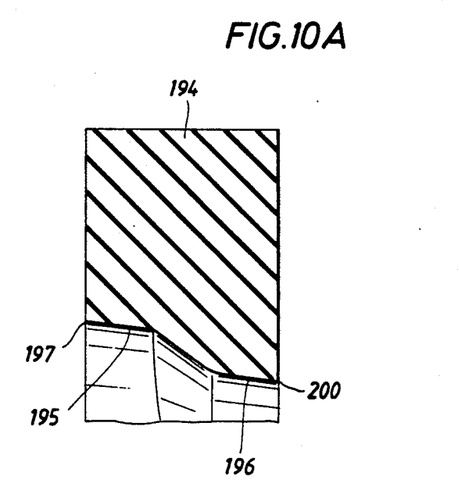
Figure 11:
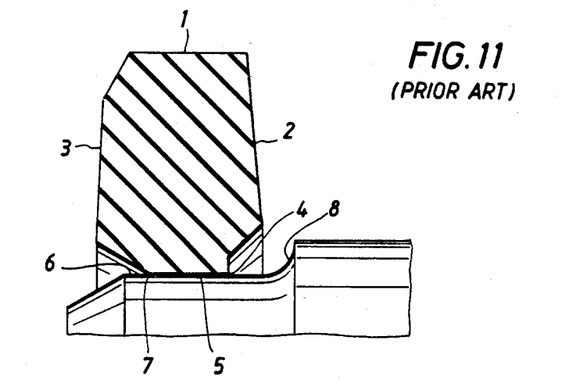
FIG. 11 is a fragmentary sectional view illustrating a hydrodynamic drill bit seal representing the prior art.

When placed under radial compression a hydrodynamic sealing element may be deformed in such manner that its dynamic sealing periphery takes on an optimum configuration for efficient lubricant wedging activity and contaminant exclusion activity. As shown in FIGS. 10 and 10A, a housing structure is shown at 188 through which a rotary shaft 190 extends. The housing defines an internal seal gland 192 within which is located a ring-like hydrodynamic sealing element 194. The uncompressed configuration of the sealing element 194 is identified in FIG. 10A while the radially compressed configuration of the seal is shown in FIG. 10. In the case of the hydrodynamic seal of FIG. 10A the internal surface 195 and the hydrodynamic sealing surface 196 of the uncompressed seal are disposed in angulated relation with respect to the horizontal. The housing structure forming the seal gland 192 defines a generally cylindrical radially outer surface 198 that displaces the radially outer portion of the sealing element as shown in FIG. 10. Simultaneously, this radial compression displaces the sealing element such that its inner periphery takes on the configuration of the rotary shaft as indicated in FIG. 10, thereby causing the inner periphery of the seal to assume a desired configuration for efficient hydrodynamic lubricant wedging activity and allowing the circular edge 197 to remain clear of the shaft as shown in FIG. 10. In this case, it should be born in mind that the resulting, compressed configuration of the seal is somewhat twisted but its twisted configuration is optimum for hydrodynamic movement of lubricant at the dynamic interface and for effective compression for efficient sealing at the dynamic sealing interface and for static sealing at the radially outer portion of the sealing element. Additionally the exclusionary edge 200 of the sealing element remains efficiently seated in scraping engagement with the cylindrical surface of the shaft 190. Thus, even though the sealing element becomes twisted when subjected to radial compression, the inner configuration of the sealing element compensates to keep the sharp exclusion edge in contaminant excluding contact with the sealing surface of the shaft.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A twist resistant hydrodynamically lubricated rotary squeeze packing type sealing element for lubricated, contaminant excluding sealing with a circular sealing surface being rotatable relative thereto, comprising;

(a) a generally ring-like body of resilient sealing material having inner and outer radial peripheries one of which being adapted to establish a dynamic sealing interface with a circular sealing surface being rotatable relative thereto and the other of which being adapted for peripheral sealing engagement with a static sealing gland surface having radially spaced relation with said rotatable circular sealing surface, said generally ring-like body further having axial extremities defining a lubricant side and a contaminant side;

(b) a dynamic circumferential sealing protuberance being provided on one of said inner and outer radial peripheries of said ring-like body and adapted for sealing relation with said rotatable circular sealing surface, said dynamic circumferential sealing protuberance being of an axially varying configuration on said lubricant side for establishing hydrodynamic wedging of lubricant within said dynamic sealing interface and defining a sharp circular edge on said containment side for excluding contaminants from said dynamic sealing interface;

(c) a circular static circumferential sealing protuberance being provided on the other of said inner and outer radial peripheries of said ring-like body of resilient sealing material and being disposed for sealing engagement with said static sealing gland surface, said circular static circumferential sealing protuberance being located in radial opposition with said dynamic circumferential sealing protuberance; and (d) said dynamic and static circumferential sealing protuberances being substantially symmetrical and being subject to substantially equal distortion upon radial compression of said generally ring-like body of resilient sealing material between said rotatable circular sealing surface and said static sealing gland surface, whereby said generally ring-like body of resilient sealing material remains free of compression induced twisting when placed under radial compression.

2. The twist resistant hydrodynamically lubricated rotary squeeze packing type sealing element of claim 1, wherein:

said circular static circumferentially sealing protuberance and said dynamic circumferential sealing protuberance cooperate to provide a reaction to compressive loads without causing a corresponding twisting of said generally ring-like body of sealing material forming said hydrodynamically lubricated rotary sealing element.

3. The twist resistant hydrodynamically lubricated rotary squeeze packing type sealing element of claim 1, wherein:

said dynamic and static circumferential sealing protuberances both being located at said containment side of said generally ring-like body of resilient sealing material and being disposed in radially opposed 4. The twist resistant hydrodynamically lubricated rotary squeeze packing type sealing element of claim 3, wherein:

said dynamic and static circumferential sealing protuberances each defining sharp circular exclusionary edges at said contaminant side of said generally ring-like body of sealing material, said sharp circular exclusionary edges being disposed in a common plane.

5. The twist resistant hydrodynamically lubricated squeeze packing type sealing element of claim 1, wherein:

a housing is provided, defining a circular seal gland forming an internal surface configuration for compressive sealing engagement with said static circumferential protuberance such that radial compression of said hydrodynamically lubricated sealing element between said internal surface configuration of said circular seal gland and said rotatable circular sealing surface achieves a seal deforming condition of substantially bilateral symmetry at said dynamic and static sealing protuberances and said one of said inner and outer peripheries including said dynamic sealing protuberance maintains a configuration such that the hydrodynamic lubricant wedging capability and contaminant exclusion capability thereof are effectively maintained.

6. The twist resistant hydrodynamically lubricated squeeze packing type sealing element of claim 1, including:

a housing defining a circular seal gland having a circumferential seal engaging surface for radially compressing said circular static sealing protuberance to thus achieve radial compression of said generally ring-like body of sealing without inducing twisting thereof.

7. A squeeze packing type hydrodynamic rotary sealing element for use in sealing between a static element defining seal containing gland having a static sealing surface and a rotary element forming a circular dynamic sealing surface, comprising:

(a) a generally circular ring-like body of resilient sealing material defining internal and external circumferential peripheries and forming a first axial extremity for contact with contaminant matter and a second axial extremity for contact with lubricant material;

(b) at least one dynamic sealing protuberance projecting in a first radial direction from said generally circular ring-like body of sealing material and adapted to establish dynamic sealing engagement with said circular dynamic sealing surface of said rotary element, said dynamic sealing protuberance forming an abrupt exclusionary shoulder at said first axial extremity for contact with said contaminant matter and for scraping contact with said circular dynamic seal surface of said rotary element, said dynamic sealing protuberance further forming a non-circular shoulder for hydrodynamic wedging contact with said lubricant material for wedging lubricant material into the interface between said dynamic sealing protuberance and said circular dynamic sealing surface of said rotary shaft; and (c) at least one circular static sealing protuberance projecting in a second radial direction from said generally circular ring-like body of sealing material for sealing contact with said static sealing surface, said circular static sealing protuberance being located in radially opposed relation with said dynamic sealing protuberance, said dynamic and static sealing protuberances being subject to substantially equal radial deformation when radially compressed between said dynamic and static sealing surfaces, upon radial compression of said generally ring-like body of resilient sealing material between said dynamic and static sealing surfaces said hydrodynamic sealing element remaining substantially free of being twisted as the result of said radial deformation.

8. The squeeze packing type hydrodynamic rotary sealing element of claim 7, wherein:

said dynamic and static sealing protuberances are each of circular configuration and are positioned at the contaminant extremity of said generally circular ring-like body of sealing material, said dynamic sealing protuberance defining said non-circular shoulder which is oriented for wedging contact with said lubricant material when said dynamic sealing protuberance has been radially deformed by compression with said dynamic sealing surface of said rotary shaft.

9. The hydrodynamic squeeze packing type sealing element of claim 7, wherein:

said static element defines a seal containing gland forming an internal circumferential sealing surface configuration for cooperative radial compression of said circular static sealing protuberance of said generally circular ring-like body of sealing material such that twisting of said generally circular ring-like body of sealing material under radial compression does not occur.

* * * * *